United States Patent Office 3,512,922
Patented May 19, 1970

---

3,512,922
NOVEL CYCLIC COMPOSITIONS
Giuliana C. Tesoro, Dobbs Ferry, N.Y., assignor to J. P. Stevens & Co., Inc., New York, N.Y., a corporation of Delaware
No Drawing. Filed June 8, 1967, Ser. No. 644,546
Int. Cl. D06m 15/54, 13/38
U.S. Cl. 8—116.2      3 Claims

---

ABSTRACT OF THE DISCLOSURE

This invention concerns the preparation of novel cyclic N,N'-substituted sulfamide derivatives and to their application to hydroxyl-containing polymeric substrates as modifying agents.

---

This invention relates to novel sulfur and nitrogen-containing cyclic compositions useful as finishing agents for polymeric textile substrates.

More particularly, this invention concerns the preparation of novel cyclic N,N'-substituted sulfamide derivatives and to their application to hydroxyl-containing polymeric substrates as modifying agents.

The modification of hydroxyl-containing textile substrates such as the cellulosics is well established in the art. While cellulosic textile materials are especially suited for garment manufacture because of their low cost, availability, durability, dyeability and comfort properties, improvements in their "wash and wear" characteristics are desirable. Within recent years it has been found that cellulosics chemically modified to produce crosslinked macromolecules have improved performance. This is particularly evidenced by enhanced crease recovery in both the dry and wet state. Especially sought are modifying agents which enhance crease recovery without a corresponding substantial increase in chlorine retention and a decrease in tensile strength. Modifying agents which impart improved wet and dry crease recovery to the treated cellulosic textile substrate without a concurrent impairment in physical properties continue to be of considerable interest in the textile art.

It is an object of this invention, among many others, to prepare a group of compositions, the cyclic N,N'-substituted sulfamides, heretofore unreported in the literature.

Another object of this invention is to disclose the utility of the above sulfamides as modifying agents for hydroxyl-containing polymers.

A more specific object of this invention is the utilization of the above reagents as crosslinking agents for cellulosic substrates to produce modified cellulosics which, when fabricated into garments, exhibit good wet and dry crease recovery without excessive damage due to retained chlorine (during bleaching) or substantial reduction in tensile strength.

Yet a further object of this invention is to make available processes for applying said modifying agents to cellulosic and other hydroxyl-containing substrates so as to effect permanent modification thereof.

Additional objects will suggest themselves to those skilled in the art after a perusal of this application.

The above objects are achieved by preparing compositions corresponding to the formula:

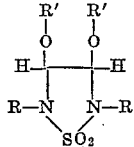

wherein R is selected from the group consisting of hydrogen, hydroxymethyl, alkoxymethyl and alkyl, and R' is selected from the group consisting of hydrogen and lower alkyl.

In the favored practice, sulfamide ($H_2N$—$SO_2$—$NH_2$) is contacted with glyoxal to form a condensation product corresponding to the formula:

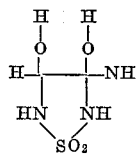

This product can be employed without further transformation as a modifying agent or it can be further reacted at the >HR or —OH groups with suitable reagents to form diverse derivatives.

In another compositional embodiment, a group of related six-membered cyclic compositions can be prepared by contacting a dialdehyde containing three carbon atoms, such as for example, malonic aldehyde or its acetal, with sulfamide to form a six-membered condensation product corresponding to the formula:

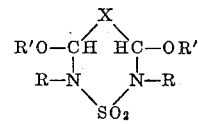

wherein X is selected from the group consisting of —$CH_2$— and —CHOR', wherein R' is selected from the group consisting of hydrogen and lower alkyl, and R is selected from the group consisting of hydrogen, hydroxymethyl, alkoxymethyl and alkyl.

In the preferred practice, the novel five-membered cyclic compounds of this invention are prepared by contacting stoichiometric or near-stoichiometric quantities of the dialdehyde reactant with the sulfamide reactant, allowing the reaction mixture to stand until the product is formed in substantial yield, then concentrating and isolating the product. The product obtained by following this procedure can be further purified by conventional purification procedures such as recrystallization employing appropriate solvents.

The dihydroxylated product can be converted to the desired alkoxy derivative by refluxing in the presence of the appropriate precursor alkanol. N,N'-substituted derivatives can be prepared by contacting the compound containing the two >NH groups with formaldehyde until the desired mono or dimethylol derivative is formed. Other derivatives are prepared using known reactions which are documented in the technical literature.

To more clearly set forth the preparative aspect of this invention, the following examples are submitted:

EXAMPLE 1

Preparation of dihydroxy ethylene sulfamide

To a reaction vessel is added 500 parts by weight of sulfamide and 837 parts by weight of a 43% by weight aqueous glyoxal solution. The reaction mixture is stirred until the sulfamide is completely dissolved (about 1.5 hours), then allowed to stand overnight. At the end of this time the water is stripped off under vacuum, leaving a clear glass-like product. Infrared spectral data indicate that a product corresponding to the structure below is produced, the systematic name of which is 3,4-dihydroxy-1,2,5-thiadiazolidine-1,1-dioxide:

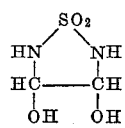

EXAMPLE 2

Preparation of the dimethoxy ethylene sulfamide

To a reaction flask is added 288 parts by weight of sulfamide and 435 parts by weight of a 43% by weight aqueous solution of glyoxal. The reaction mixture is stirred overnight at which time about 500 parts by weight of methanol is added. The reaction mixture is heated with stirring to about 65° C. for several hours. The volatiles are then stripped off under vacuum to yield a product whose analytical data fit a dimethyl ether corresponding to the structure of 3,4-dimethoxy-1,2,5-thiadiazolidine-1,1-dioxide:

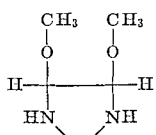

EXAMPLE 3

Preparation of N,N'-bis(hydroxymethyl)dimethoxy-ethylene-sulfamide

To an appropriate reaction flask is added 9.1 parts by weight of the dimethyl ether product prepared as in Example 2, 2.25 parts by weight of formaldehyde (in the form of an aqueous 37% by weight solution) and 50 parts by weight of water. The reaction mixture is stirred, the pH adjusted to 5 and warmed to dissolve the reactants. The reaction mixture is brought up to 50–55° C. and stirred at this temperature range for one hour. At the end of this time, the reaction mixture is cooled and taken up in an ether-ethyl acetate mixture and dried. The product solution is filtered and stripped under vacuum, leaving a solid product which analysis indicates corresponds to the structure of 2,5-bis(hydroxymethyl)-3,4-dimethoxy-1,2,5-thiadiazolidine-1,1-dioxide:

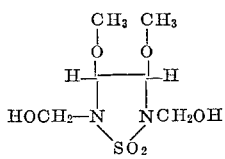

The crosslinking agents of this invention can be applied to the hydroxyl-containing polymeric substrates by a number of conventional application methods well known in the textile art. These include, but are not limited to brushing, spraying, coating and the like. The agents can be in the form of solutions, slurries, suspensions, emulsions or the like, where appropriate, the main requirement being that at least a modifying amount of reagent is deposited on the polymeric substrate to be treated. A modifying amount is that quantity of reagent required to impart substantially enhanced crease recovery both in the dry and wet state to the treated substrate. Because of experimental variables, differences from reagent to reagent and the particular effect sought, a modifying amount cannot be stated with precision. However, in most instances this "amount" ranges between 5–15% by weight of reagent based upon the weight of treated substrate, the upper limit being primarily governed by economic considerations. Ordinarily, it is convenient to utilize an inert solvent as a carrier for the reagent. The choice of solvent is not critical as long as it possesses good solubilizing characteristics and readily removable by evaporation or other means. Illustrative inert solvents include water, tertiary amides such as N,N-dimethylformamide, N,N-dimethylacetamide, 1-methyl-2-pyrrolidinone, 1,5-dimethyl-2-pyrrolidinone, cyclic ethers such as the tetrahydrofurans, the dioxanes and trioxanes, aliphatic ethers such as $CH_3OCH_2CH_2OCH_3$ and sulfoxides such as dimethyl sulfoxide, as well as mixtures of one or more of these solvents.

A convenient mode of application is padding. In this procedure the textile is impregnated with a solution of the reagent in inert solvent containing an acidic catalyst if required, the rolls of the padder being set to the desired wet pickup. The treated textile is dried, usually between about 50° C. to 85° C. and cured above 100° C., usually between about 120° C.–160° C. The cured, dried samples are usually conditioned to the desired moisture content by exposing them to an appropriate humidity level.

In addition to the modifying reagents of this invention, the padding bath can contain one or more optional textile adjuvants such as softeners, conditioners, surfactants and the like. Since these reagents are not critical to the success of this invention, no attempt is made to enumerate the various adjuvants that can be employed. It will suffice to say exhaustive lists of these can be found in the technical and patent literature.

The modifying of cellulosic substrates by typical modifying agents is described in the following examples. A description of the test procedures follows:

*Crease recovery* angle in degrees, total of crease recovery angles in warp and filling directions; Monsanto method, ASTM D–1295–60T.

*Tensile strength* in pounds in warp direction, ravel one-inch strip method; Federal Specifications for Textile Test Methods, CCC–T–191–b, Method 5104.1, ASTM D–39–59.

*Tear strength* in pounds in warp direction; Elmendorf Method, ASTM D–1424–59.

*Damage caused by retained chlorine.*—Percentage of tensile strength lost between scorched and unscorched strips; AATCC 92–1962T.

*Test conditions.*—Fabric samples were conditioned and tested at 21±1° C. at a relative humidity of 65±2%.

*Parts and percentages were by weight*—unless otherwise noted.

*Abbreviations in tables.*—when used individually, F means filling direction, and W means warp direction.

*OWB.*—on the weight of the bath used for padding, in percent.

*OWF.*—on the weight of the fiber (or fabric), i.e., the percentage based on the weight of the fabric prior to padding. OWB times WPU/100%=OWF.

*WPU.*—wet pickup, i.e., the percentage of wet add-on OWF, measured directly after padding.

*Extent of utilization of padded reagent (in percent).*—Let $f$=the found weight gain expressed in percent, and $t$=the maximum weight gain theoretically possible, expressed in percent, considering the formula weight $e$ of the moiety of the sulfamide derivative reacting with the cellulose, and the formula weight E of the reagent applied, as well as the percentage of that reagent OWF. That is, $t=(e/E)$ times (percent OWF). Therefore, $f$ times $100\%/t$=the extent of utilization, in percent of the padded reagent.

$$\text{Percent utilization} = \frac{f(100\%)E}{(\text{percent } OWF)e}$$

*Moisture regain*—(in percent) is the weight of moisture calculated as a percentage of the bone-dry weight.

percent $R=W$ times $100\%/b=(M-b)$ times $100\%/b=W$ times $100\%/(M-W)$, where
R is the moisture regain,
$b$=bone-dry weight=$M-W$,
M=original weight of the conditioned specimen, and
W=weight of moisture=$M-b$.

EXAMPLE 4

Modification of cotton using dihydroxyethylene sulfamide

*Application of the reagent of Example 1 to 80 x 80 cotton printcloth.*—Using the procedure of Example 1, the reaction mixture is adjusted to pH 5.6 with aqueous (5 N) NaOH to give a product containing approximately 59% by weight of the desired reagent. This product is further treated as described below:

*Run A–(1).*—The solution from above is diluted with water to give a 10% concentration of reagent by weight in the bath and it is applied to the fabric by padding. The treated fabric is dried at 65° C., cured at 163° C., rinsed first in dilute acetic acid, then rinsed in a 0.1% by weight aqueous solution of a nonionic detergent [isooctylphenol bound to 9–10 (average) repeating units of ethylene oxide].

*Run A–(2).*—The solution containing 59% by weight of product is treated with $KHCO_3$ to give a solution of pH 7.0, diluted with water to give a 10% concentration of reagent in the bath by weight and it is applied to the fabric by padding. Drying, curing and rinsing is identical to A–(1).

*Run B–(1).*—The 59% by weight solution is diluted with water to give a 10% by weight concentration of reagent in the bath and it is applied with 0.57% by weight of zinc nitrate to the fabric.

*Run B–(2).*—The 59% by weight solution is diluted as before to give a concentration of 10% by weight of reagent in the bath and applied with 0.5% by weight of zinc nitrate and 0.05% by weight acetic acid to the fabric. Both runs are dried at 65° C., cured for 3 minutes at 163° C. and rinsed first with a 2% by weight aqueous solution of $KHCO_3$, then with a 0.1% by weight aqueous solution of a nonionic detergent [isooctylphenol bound to 9–10 (average) repeating units of ethylene oxide].

*Run C–(1).*—The 59% by weight solution of reagent diluted to 10% by weight as in B–(1) and B–(2), is applied to the fabric with 0.29% by weight of magnesium chloride.

*Run C–(2).*—The 59% by weight solution of reagent diluted as in C–(1) is applied to the fabric with 1.8% by weight of $MgCl_2$. Both runs are dried, cured and rinsed as in B–(1) and B–(2).

TABLE II.—SUMMARY OF ANALYTICAL DATA ON THE TREATED SAMPLES CONFIRMING THAT THE DESIRED REACTION OF REAGENT WITH FABRIC TAKES PLACE (EXAMPLE 4)

| Run | Sulfur, Percent | | Nitrogen, Percent | |
|---|---|---|---|---|
| | Found | Calculated* | Found | Calculated* |
| A. (1) | 1.19 | 1.06 | 0.88 | 0.93 |
| (2) | 0.69 | 0.79 | 0.50 | 0.69 |
| B. (1) | 0.73 | 0.86 | 0.58 | 0.75 |
| (2) | 0.42 | 0.55 | 0.19 | 0.48 |
| C. (1) | 0.50 | 0.62 | 0.41 | 0.54 |
| (2) | 0.48 | 0.28 | 0.32 | 0.24 |

*Calculated from corrected weight gain.

EXAMPLE 5

Modification of cotton using dimethoxyethylene sulfamide (I) *Application of the reagent of Example 2 to 80 x 80 cotton printcloth.*—The product of Example 2 is dissolved in a 9:1 mixture of water and dimethylformamide and is treated as described below. In all instances the dilutions are arranged to give a 10% by weight concentration of "dimethyl ether" reagent in the bath. The different application runs are as described below:

*Run A–(1).*—The reagent is applied to the fabric "as is" without pH adjustment.

*Run A–(2).*—The reagant is adjusted to pH 7.0 with NaOH and applied to the fabric.

*Run B–(1).*—The reagent is applied with 0.6% by weight of $Zn(NO_3)_2$.

*Run B–(2).*—The reagent is applied with 1.0% by weight of $MgCl_2$.

All four runs are dried at 65° C., cured for three minutes at 163° C., rinsed in 2% by weight $KHCO_3$, then rinsed with a 1% by weight aqueous solution of the same nonionic detergent of Example 4 (isooctylphenol bound as previously described).

TABLE I.—SUMMARY OF THE APPLICATION DATA (EXAMPLE 4)

| | Bath | | | | | Results, Percent | | | | | |
|---|---|---|---|---|---|---|---|---|---|---|---|
| | Reagent Concentration, percent | Other Reagents | Bath, pH | WPU | OWF | Weight Gain | | | Utilization | Moisture Regain |
| Run | | | | | | Found | Corrected* | Calculated | | |
| A. (1) | 10 | | 3.4 | 96 | 9.60 | 4.47 | 4.18 | 7.35 | 56 | 6.82 |
| (2) | 10 | | 6.9 | 96 | 9.60 | 3.60 | 3.01 | 7.35 | 41 | 7.04 |
| B. (1) | 10 | 0.57% Zn(NO₃)₂ | | 92 | 9.20 | 3.50 | 3.28 | 7.05 | 46.5 | 6.67 |
| (2) | 10 | 0.32% Zn(NO₃)₂+0.05% Acetic Acid | | 89 | 8.90 | 2.29 | 2.06 | 6.82 | 30 | 6.68 |
| C. (1) | 10 | 0.29% MgCl | | 93 | 9.30 | 2.45 | 2.35 | 7.12 | 33 | 6.55 |
| (2) | 10 | 1.8% MgCl | | 94 | 9.40 | 1.32 | 1.02 | 7.20 | 14 | 6.65 |
| D. Untreated Control | | | | | | | | | | 6.20 |

*Corrected for changes in moisture regain.

TABLE I.—SUMMARY OF THE APPLICATION DATA (EXAMPLE 5)

| | Bath | | | | | Weight Gain, Percent | | | | Moisture Regain, Percent |
|---|---|---|---|---|---|---|---|---|---|---|
| Run | Reagent Concentration, Percent | Other Reagents | Bath, pH | WPU, Percent | OWF, Percent | Found | Corrected* | Calculated | Utilization, Percent | |
| A. (1) | 10 | | 5.3 | 89 | 8.90 | 4.28 | 3.90 | 5.77 | 67 | 6.58 |
| (2) | 10 | | 7.0 | 89 | 8.90 | 4.41 | 3.83 | 5.77 | 66 | 6.78 |
| B. (1) | 10 | Zn(NO₃)₂; 0.6% | | 88 | 8.80 | 4.60 | 4.05 | 5.70 | 71 | 6.75 |
| (2) | 10 | MgCl₂; 1.0% | | 90 | 9.00 | 4.47 | 4.11 | 5.84 | 70 | 6.56 |
| Untreated Control | | | | | | | | | | 6.20 |

*Corrected for changes in moisture regain.

TABLE II.—SUMMARY OF ANALYTICAL DATA ON THE TREATED SAMPLES CONFIRMING THAT THE DESIRED REACTION OF REAGENT WITH FABRIC TAKES PLACE (EXAMPLE 5)

| Run | Sulfur, Percent | | Nitrogen, Percent | |
|---|---|---|---|---|
|  | Found | Calculated* | Found | Calculated* |
| A. (1) | 0.88 | 1.01 | 0.72 | 0.89 |
| (2) | 0.88 | 1.00 | 0.77 | 0.87 |
| B. (1) | 1.07 | 1.05 | 0.97 | 0.92 |
| (2) | 0.96 | 1.07 | 0.88 | 0.94 |

*Calculated from corrected weight gain.

plied to the fabric in the presence of 0.3% by weight $Zn(NO_3)_2$ and 0.05% by weight acetic acid.

*Run B–(2).*—The unadjusted reagent solution is applied to the fabric in the presence of 0.5% by weight of $Zn(NO_3)_2$ and 0.5% by weight acetic acid.

*Run C–(1).*—The unadjusted reagent solution is applied to the fabric in the presence of 0.3% by weight of $MgCl_2$.

*Run C–(2).*—The unadjusted reagent solution is applied to the fabric in the presence of 1.8% by weight $MgCl_2$.

All six samples are dried at 65° C., cured for three minutes at 163° C., and rinsed first with dilute (2% by weight) $KHCO_3$, then rinsed with water. Table I, below, summarizes the application data.

TABLE I.—SUMMARY OF THE APPLICATION DATA (EXAMPLE 6)

| Run | Bath, Percent | | | | Bath, pH | WPU, percent | OWF, percent | Weight Gain, Percent | | Moisture Regain, precent |
|---|---|---|---|---|---|---|---|---|---|---|
|  | Reagent | $Zn(NO_3)_2$ | Acetic Acid | $MgCl_2$ |  |  |  | Found | Corrected* |  |
| A. (1) | 10.0 |  |  |  | 3.7 | 92 | 9.20 | 2.39 |  |  |
|  | Duplicate |  |  |  |  | 89 | 8.90 | 1.80 |  |  |
| A. (2) | 10.0 |  |  |  | 7.0 | 91 | 9.10 | 3.05 |  |  |
|  | Duplicate |  |  |  |  | 89 | 8.90 | 3.34 | 2.17 | 7.64 |
| B. (1) | 9.9 | 0.3 | 0.05 |  |  | 91 | 9.00 | 3.32 |  |  |
|  | Duplicate |  |  |  |  | 88 | 8.70 | 2.89 |  |  |
| B. (2) | 9.9 | 0.6 | 0.05 |  |  | 92 | 9.10 | 4.53 |  |  |
|  | Duplicate |  |  |  |  | 91 | 9.00 | 5.39 | 4.73 | 7.13 |
| C. (1) | 9.9 |  |  | 0.3 |  | 89 | 8.81 | 2.63 |  |  |
|  | Duplicate |  |  |  |  | 89 | 8.81 | 2.61 |  |  |
| C. (2) | 9.4 |  |  | 1.8 |  | 94 | 8.84 | 3.41 |  |  |
|  | Duplicate |  |  |  |  | 95 | 8.93 | 4.00 | 3.24 | 7.23 |
| Untreated Control |  |  |  |  |  |  |  |  |  | 6.47 |

*Corrected for changes in moisture regain.

(II) *Results.*—The characteristics of the modified cotton fabric appear below.

TABLE III (EXAMPLE 5)

| Samples | Tensile Strength (1″ Strip Method, lbs.)—Warp | Recovery from Creasing (Monsanto, Degrees) | | Percent Damage Due to Retained Chlorine (AATCC 92-1962T)—Warp |
|---|---|---|---|---|
|  |  | Total Dry | Total Wet |  |
| A. (1) | 21 | 226 | 220 | 74 |
| (2) | 26 | 230 | 228 | 71 |
| B. (1) | 15 | 226 | 225 | 50 |
| (2) | 17 | 226 | 233 | 63 |

TABLE II.—SUMMARY OF ANALYTICAL DATA ON THE TREATED SAMPLES CONFIRMING THAT THE DESIRED REACTION OF REAGENT WITH FABRIC TAKES PLACE (EXAMPLE 6)

| Run | Sulfur, percent | | Nitrogen, percent | |
|---|---|---|---|---|
|  | Found | Calculated[1] | Found | Calculated[1] |
| A. (2) | 0.35 | 0.42 | 0.69 | 0.48 |
| B. (2) | 0.80 | 0.89 | 0.89 | 1.02 |
| C. (2) | 0.49 | 0.62 | 0.79 | 0.71 |

[1] Calculated from corrected weight gain.

(II) *Results.*—The Table below summarizes the characteristics of the modified cotton fabric cured in the presence of both acidic and alkaline catalyst.

TABLE III (EXAMPLE 6)

| Sample, SS-66-109 | Tensile Strength (1″ Strip Method, lbs.)—Warp | Tear Strength (Elmendorf Method, lbs.)—Warp | Recovery from creasing (Monsanto, Degree) | | Percent Damage Due to Retained Chlorine (AATCC 92-1962T)—Warp |
|---|---|---|---|---|---|
|  |  |  | Total Dry | Total Wet |  |
| A. (1) | 49 | 1.5 | 221 | 182 | 6 |
| (2) | 49 | 1.3 | 233 | 189 | 10 |
| B. (1) | 50 | 1.4 | 225 | 191 | 8 |
| (2) | 41 | 1.4 | 269 | 228 | None |
| C. (1) | 53 | 1.3 | 234 | 209 | None |
| (2) | 25 | 0.8 | 288 | 259 | None |

EXAMPLE 6

Modification of cotton using N,N-dimethylol dimethoxyethylene sulfamide (I) *Application of the reagent of Example 3 to 80 x 80 cotton printcloth.*—The product of Example 3 is dissolved in a solvent composed of equal parts by weight of dioxane and water to form a solution having a concentration of 10% by weight of a product. The application methods employed are described below:

*Run A–(1).*—The reagent solution having a pH of 3.5 is applied to the fabric without further pH adjustment.

*Run A–(2).*—The reagent solution is adjusted with $KHCO_3$ to a pH of 7.0 and applied to the fabric.

*Run B–(1).*—The unadjusted reagent solution is ap-

As indicated by the preceding examples, and the accompanying text, this invention is advantageous in several aspects. For example, the compositions of this invention are produced in good yield from readily available starting materials. Further, the products can be used unpurified in the form of their reaction mixtures. In addition, the products are utilizable in relatively low concentrations and produce modified cellulosics which when fabricated into garments, exhibit good wet and dry recovery. Other advantages will become apparent to those skilled in the art, upon a further study of this application.

Numerous changes and modifications of this invention can be made in reactants, reaction conditions, application techniques and the like without deviating substantially from the inventive concept. The metes and bounds of the invention are best typified by the claims which follow.

What is claimed is:
1. A method of modifying cellulosic textile materials comprising:
   (a) treating the material to be modified with a modifying amount of a cyclic N,N'-substituted sulfamide composition corresponding to the formula:

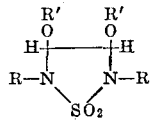

wherein R is selected from the group consisting of hydrogen, hydroxymethyl, alkoxymethyl and alkyl, and R' is selected from the group consisting of hydrogen and lower alkyl, and
   (b) heating the treated material until curing takes place and the material is modified.

2. The method of claim 1 wherein R' and R of the treating composition are hydrogen.

3. The method of claim 1 wherein R' is methyl and R is —$CH_2OH$.

References Cited
UNITED STATES PATENTS 2,624,729   1/1953   Melamed et al. ____ 260—306.7

DONALD LEVY, Primary Examiner

J. CANNON, Assistant Examiner

U.S. Cl. X.R.

8—115.6, 116.3; 260—306.7

UNITED STATES PATENT OFFICE
CERTIFICATE OF CORRECTION

Patent No. 3,512,922                    Dated May 19, 1970

Inventor(s)  GIULIANA C. TESORO

It is certified that error appears in the above-identified patent and that said Letters Patent are hereby corrected as shown below:

Column 2, line 14  "reacted at the  $>$HR  or  -OH groups" should read  -- reacted at the $>$NH  or  -OH groups -- .

Signed and sealed this 23rd day of March 1971.

(SEAL)
Attest:

EDWARD M. FLETCHER, JR.          WILLIAM E. SCHUYLER, JR.
Attesting Officer                 Commissioner of Patents